Jan. 22, 1963    L. B. WALTON    3,074,340
COFFEE MAKING APPARATUS
Filed May 20, 1960    3 Sheets-Sheet 1
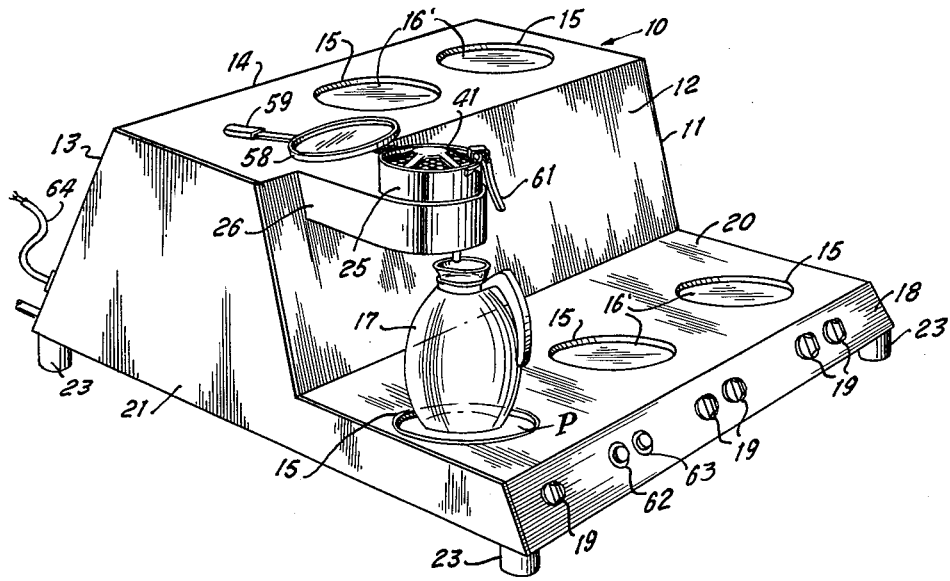
Fig. 1
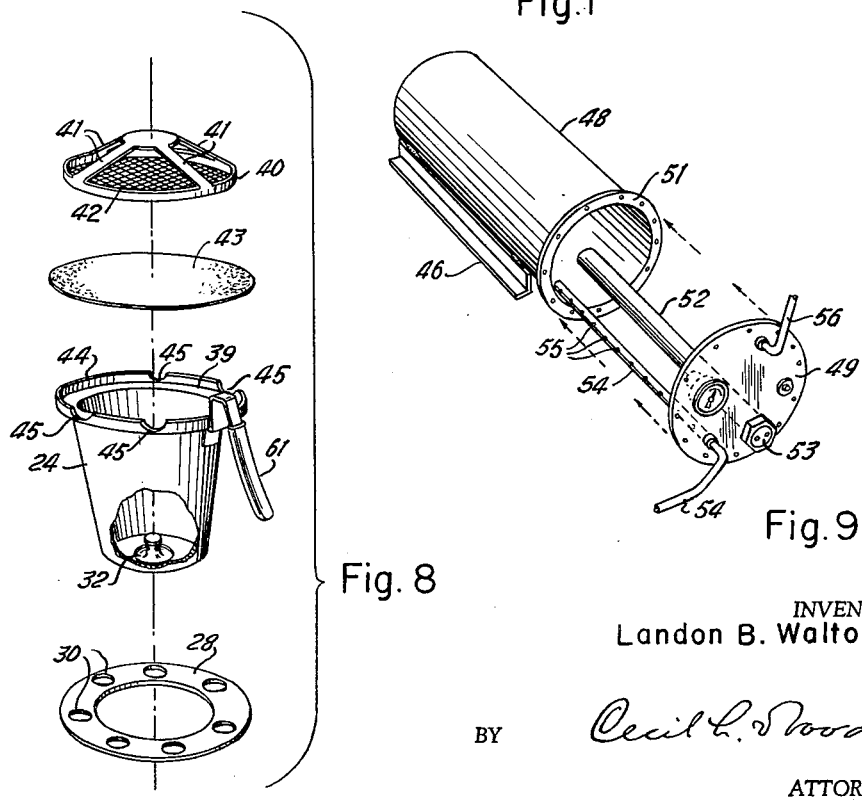
Fig. 8
Fig. 9
INVENTOR
Landon B. Walton
BY Cecil L. Wood
ATTORNEY Jan. 22, 1963  L. B. WALTON  3,074,340
COFFEE MAKING APPARATUS
Filed May 20, 1960  3 Sheets-Sheet 2

INVENTOR
Landon B. Walton

BY Cecil L. Wood
ATTORNEY

Jan. 22, 1963 L. B. WALTON 3,074,340
COFFEE MAKING APPARATUS
Filed May 20, 1960 3 Sheets-Sheet 3

INVENTOR
Landon B. Walton

BY
ATTORNEY

3,074,340
COFFEE MAKING APPARATUS
Landon B. Walton, 3013 Fadal St., Waco, Tex.
Filed May 20, 1960, Ser. No. 30,554
3 Claims. (Cl. 99—283)

This invention relates to automatic coffee brewing devices, and it has particular reference to apparatus of the type used in restaurants, cafes, and the like, where substantial quantities of freshly brewed coffee is dispensed, and its principal object resides in the provision of an improved brewing cartridge in which the ground coffee is deposited and into which hot water is admitted to pass through the ground coffee and into a receptacle from which the beverage is syphoned into serving containers.

A prime object of the invention is that of providing a compact cartridge which is easily removed for cleaning, and readily assembled and installed.

An object of the invention is that of providing a coffee brewing device wherein the proper amount of water, at the desired temperature, is brought into contact with a predetermined quantity of coffee, to be merged and commingled therewith under proper conditions, and for a predetermined period of time, to extract the soluble solids from the coffee and produce a uniform and satisfying brew.

A further object of the invention resides in the provision of a complete automatic coffee making unit in which the coffee cartridge and its holder are embodied and wherein the brewing water is heated automatically and maintained at desired temperatures, the flow being controlled by suitable valve means connected in an electrical circuit and actuated by the weight of a serving container receiving the brew from the cartridge.

A further object of the invention is that of providing an automatic coffee maker which can be embodied in a compact and attractive cabinet having a plurality of electrical heating units, individually controlled, by which a number of serving receptacles containing the brewed beverage can be kept properly heated at all times for ready use.

Broadly, the invention contemplates the provision of a brewing cartridge, or hopper, for freshly ground coffee through which the preheated water can be passed automatically, and in measured quantities, and flowed into a reservoir from which the brew is syphoned into convenient size serving pots.

While the foregoing objects are paramount, other and lesser objects will become manifest as the description proceeds, taken in connection with the appended drawings wherein:

FIGURE 1 is a perspective view of a coffee brewing unit embodying the invention, and having a plurality of heating elements.

Figure 3:
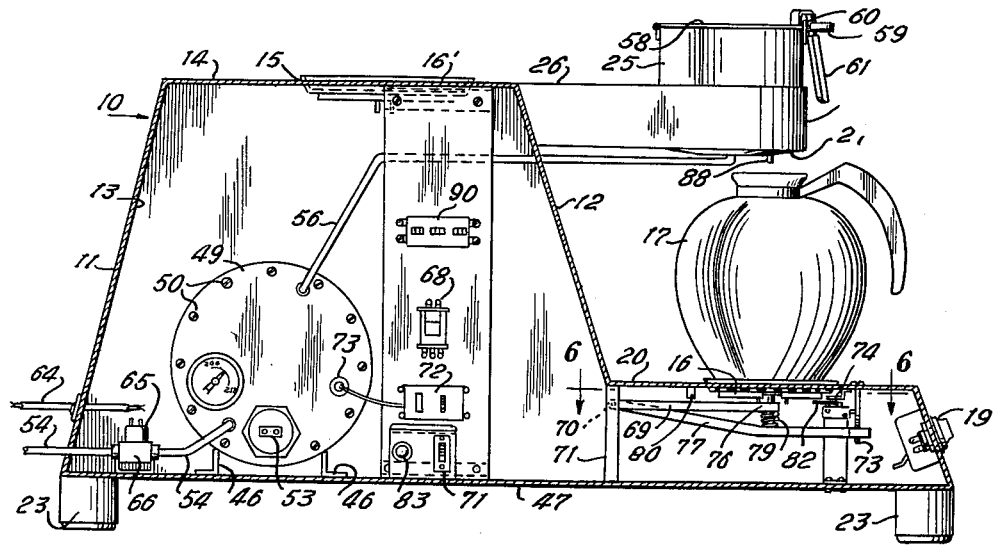
FIGURE 3 is a side elevational view of the invention, the cabinet being shown in transverse section on line 3—3 of FIGURE 2, showing the water tank, the solenoid water valve, the thermostat controlling the tank heating unit, and the micro-switch.
Figure 6:
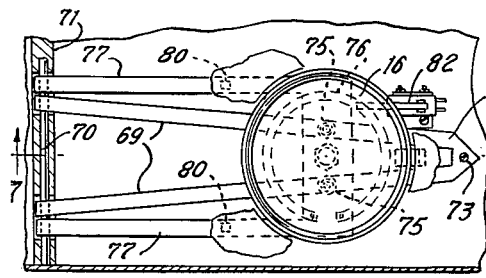

FIGURE 6 fragmentarily illustrates in plan, on line 6—6 of FIGURE 3, the micro-switch actuating mechanism, or scale, and the heating element.

Figure 7:
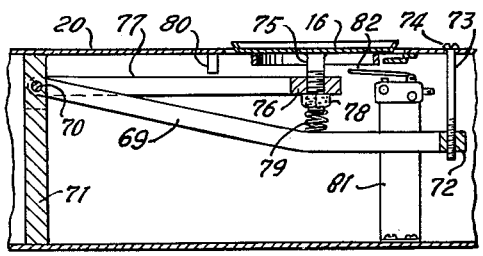

FIGURE 7 is a fragmentary sectional view, on line 7—7 of FIGURE 6, showing the micro-switch and its actuating mechanism, and a heating element.

FIGURE 8 is a perspective exploded view of the coffee cartridge and its supporting ring.

Figure 10:
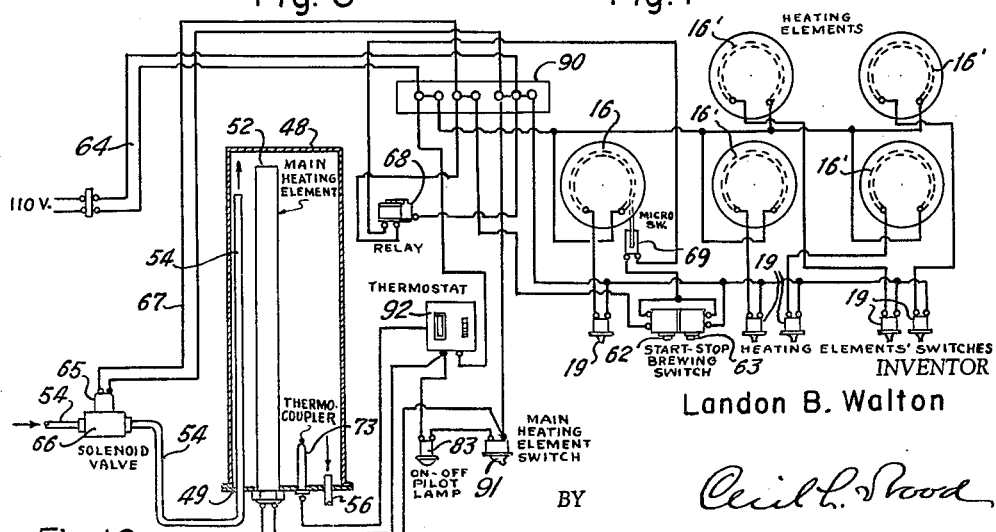

FIGURE 9 is a perspective exploded view of the water heating tank and the heating element and flow tubes, and FIGURE 10 illustrates a typical wiring circuit by which the various elements are energized.

Figure 2:
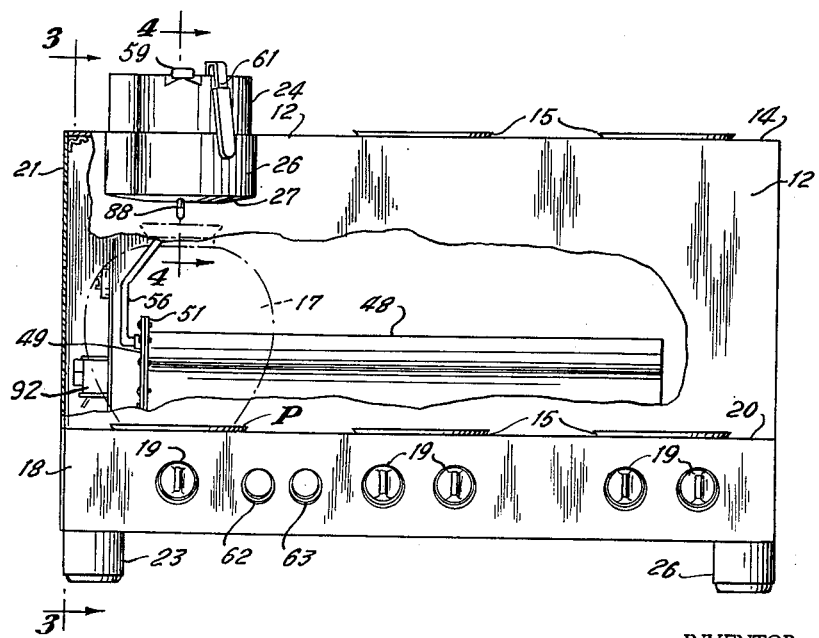
FIGURE 2 is a front elevational view of the invention, and the brewing unit cabinet, a portion being cut away to show the water heating tank.

The invention, as stated, is embodied in a structure of generally conventional design which includes a cabinet 10, illustrated in perspective in FIGURE 1, and partially in transverse section in FIGURES 2 and 3. While the cabinet 10 may have any desired form, the illustrated structure comprises a body 11 having front and rear angular walls 12 and 13 and a planar top 14 in which circular recesses 15 are formed to receive heating elements 16 and 16' on which coffee containers 17 maintain the contents at desired temperatures. The elements 16 and 16' will be presently described in greater detail.

The front portion of the cabinet 10 extends from the base of the front wall 12 and in a plane parallel to the top 14, but substantially lower, and has an inclined front panel 18 on which is arranged a series of switches 19, each of which controls one of the heating elements 16' in the top 14, as well as similar elements 16 and 16' in recesses 15 in the surface 20 of the front portion of the cabinet 10. The cabinet 10 has end closures 21 and 22, the former being preferably detachable to gain access to elements enclosed within the cabinet 10, as shown in FIGURE 3. Suitable supporting legs 23 are provided for the cabinet 10.

Figure 4:
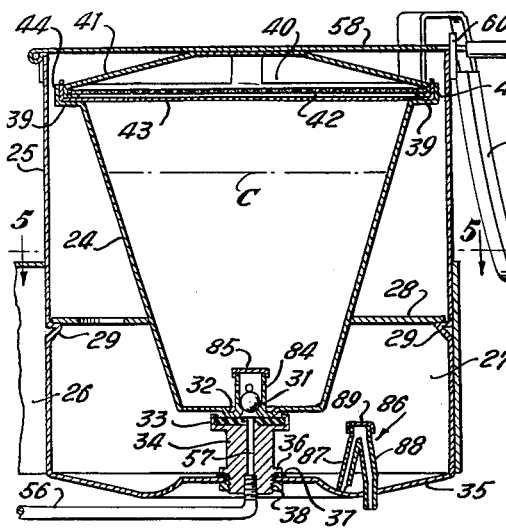
FIGURE 4 is a fragmentary sectional view of the coffee cartridge, on lines 4—4 of FIGURE 2, showing the cartridge holder and coffee reservoir, the ball check valve in the cartridge, and the syphon outlet.
Figure 5:
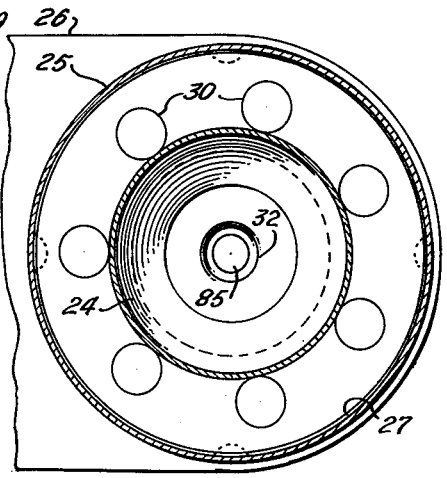
FIGURE 5 is a fragmentary sectional view, on line 5—5 of FIGURE 4, illustrating the bottom of the cartridge and the holder ring closing the reservoir.

The invention comprises a coffee cartridge 24, shown in detail in FIGURES 4, 5 and 8, with its holder device 25 which is supported in a bracket 26 which forms an integral part of the body 11 of the cabinet 10, as exemplified in FIGURES 1, 2 and 3, and extends forwardly over the front portion and spaced above the surface 20 thereof so that a coffee serving container 17 can be arranged therebeneath to receive the brewed beverage therefrom, in the manner shown in FIGURES 1 and 3, and in dotted lines in FIGURE 2.

The holder 25 is seated in the outer end of the bracket 26 and has a reservoir 27 formed therewith, as shown in the vertical cross-section in FIGURE 4, and which receives the brew from the cartridge 24.

While the cartridge 24 may be cylindrical, if desired, it is illustrated in FIGURES 4 and 8 as having a frustroconical form and its lower end is embraced by a circular plate 28 which is seated upon an annular bead 29 formed internally of the holder 25. The plate 28 has a series of spaced apertures 30 therein, as shown in FIGURES 5 and 8, through which the brewed coffee passes into the reservoir 27, as will presently become manifest.

In the bottom of the cartridge 24 is an inlet opening 31 which is surrounded by an annular bead 32 providing a seat which engages a yieldable sealing washer 33 of rubber, plastic, or similar materials, arranged in the recessed top of a fitting 34 extending through the bottom 35 of the reservoir 27, centrally thereof. The fitting 34 has a flange 36 formed about its lower end which engages a gasket 37 providing a seal in the bottom 35 of the reservoir 27. The lower end of the fitting 34 is threaded and has a nut 38 thereon to secure the same in the bottom 35 of the reservoir 27.

The cartridge 24 has an angular peripheral flange 39 formed about its upper rim providing a seat for a filter frame comprising a conical cage formed by a ring 40 and a plurality of outwardly inclined radial members 41 integrally connected to the ring 40 at their outer ends. A disk 42 of a wire mesh is arranged within the ring 40, as shown in FIGURES 1, 4 and 8, immediately above a filter disk 43 preferably formed of rice paper, or other suitable and economical filter material, which is supported on the flange 39 below the conical cage. The upstanding portion 44 of the flange 39 has a series of spaced notches or recesses 45 therein whereby the brewed beverage flows from the cartridge 24 into the reservoir 27, as will become apparent as the description proceeds.

Supported in the body 11 of the cabinet 10, by brackets 46 on the bottom 47 thereof, is a water tank 48 which is preferably cylindrical and is arranged longitudinally of the body 11, as shown in FIGURES 2 and 3. The tank 48 has a detachable closure 49 on its accessible end secured by screws 50 to a flange 51. Removably secured to the closure 49, and rigidly extending into and longitudinally of the tank 48 is an electrical heating element 52, shown in FIGURE 9, which has a plug-in receptacle 53 on its outer end.

Cold water from a supply line is admitted to the tank 48 through a tube 54 which extends through the closure 49 and into the tank 48 and has a series of spaced perforations 55 along the portion extending into the tank 48 parallel to and coextensive with the heating element 52, as shown in FIGURE 9. A water outlet tube 56 is also arranged in the closure 49, opposite the tube 54, and is connected at its opposite end to the passage 57 concentrically of the fitting 34, shown in FIGURE 4.

In the process of brewing coffee the fresh ground product is deposited in suitable quantity in the cartridge 24, as indicated by the broken line C in FIGURE 4, and the filter disk 43 is fitted into position whereupon the conical cage is applied and is secured by a hinged cover 58 attached to the top of the holder 25 and having a handle 59 which can be latched to a bracket 60 on the opposite side of the holder 25, in the manner shown in FIGURES 3 and 4. Other devices may be employed for securing the conical cage in position, as desired. A suitable handle 61 is provided for the cartridge 24.

After the cartridge 24 is in position in the holder 25 the electrical circuit is energized by a starting switch 62 on the front panel 18 of the cabinet 10. A companion switch 63 is operated to shut off the current through the circuit, the latter being illustrated diagrammatically in FIGURE 10.

Connected in the circuit, which is served by a 110 V. service conduit 64, is a solenoid 65 operating a valve 66 in the cold water tube 54 to fill the tank 48 when the solenoid circuit 67 is closed by a relay 68 when the starting switch 62 is closed and when a serving container 17 is placed on the master heating element 16, which is directly beneath the cartridge 24, as shown in FIGURES 1, 2 and 3, and which, with its several supporting parts, functions as a scale assembly whereby the water supply to the tank 48 is controlled. The pan and element 16 is supported on a frame which comprises a pair of outwardly converging arms 69 pivoted at their inner ends to a rod 70 whose ends are supported in a partition 71 extending longitudinally of the cabinet 10 along the juncture of the front wall 12 thereof and the surface 20 of the lower front portion of the cabinet 10.

The arms 69 are joined at their outer ends and an internally threaded bore is provided at their juncture 72 receiving the lower threaded end of a screw 73 whose head 74 projects above the surface 20. The frame comprised by the arms 69 is adjustable vertically through the medium of the screw 73. The heating element 16 has a stem 75 whose lower end is threaded into a transverse connecting portion 76 of a frame comprising a pair of parallel arms 77 and has a lock nut 78 thereon to permit of adjustment of the pan and heating element 16 with respect to the arms 69. A pair of compression springs 79 are arranged beneath the member 76 and bear against the arms 69 to yieldably support the heating element 16 and its pan under the weight of a coffee serving container 17. Stop elements 80 are provided beneath the surface plate 20 of the front portion of the cabinet 10 to limit the upward movement of the arms 69, as shown in FIGURES 3, 6 and 7. This arrangement constitutes part of a scale assembly actuated by the weight of the container 17 and its contents adapted to shut off the valve 66 when a predetermined quantity of coffee beverage enters the container 17.

Supported on a bracket 81 within the front portion of the cabinet 10 is a micro-switch 82 which, when the heating element 16 is depressed by the weight of the container 17, and its contents, is closed to complete the circuit through the relay 68 to close the solenoid valve 66 and shut off the flow of cold water to the tank 48. When the micro-switch 82 is again opened the relay 68 opens the valve 66. The water heating element 52 begins heating the water when the control switch 91 is closed and the thermostat 92 will control the temperature by opening and closing the circuit to the water heating element 52. A pilot light 83 is energized to indicate when the water heating element 52 is in operation. The water temperature drops, either by cold water coming into the tank when coffee is being brewed, or any other reason that might cause the temperature to drop.

In the coffee making operation, therefore, when hot water is introduced into the cartridge 24 it must pass through the opening 31 which is normally closed by a ball check valve 84 in a cage 85 which surrounds the opening 31 and extends into the cartridge 24, as shown in FIGURE 4. The ball check valve 84 also prevents the fluid content of the cartridge 24 from flowing out when the same is removed for cleaning.

As the hot water passes upwardly through the ground coffee in the cartridge 24 it flows over the top of the latter through the filter disk 43 and the notches 45 in the peripheral flange 44 and down into the reservoir 27. A syphon outlet tube 86 is arranged in the bottom of the reservoir 27; and has two legs 87 and 88; the former rests on the recessed bottom 35 of the reservoir 27 while the opposite leg 88 extends through the bottom 35 directly over the scale assembly pan and master heating element 16, as illustrated in FIGURES 1, 2, 3 and 4, so that the brewed coffee flows into the container 17 thereon as soon as its level reaches the top of the tube 86 and drains the reservoir 27. The syphon tube will not start to function until approximately four ounces of brewed coffee is in the reservoir 27. A cap 89 is provided for the syphon tube at the juncture of its legs 87 and 88 and can be removed for cleaning the tube as desired. The tube is preferably chrome plated.

The solenoid valve 66 will close automatically when the micro-switch 82 is closed by the weight of the container 17 and its contents. The circuits for all of the heating elements 16 and 16', as well as the solenoid valve 66, are closed by the switch 62 and opened by the switch 63, shown in FIGURES 1, 2 and 10. Each heating element 16 or 16' is individually turned on and off by its switch 19. All of the circuits are connected from the service conduit 64 through a terminal block 90 in the cabinet 10, and shown in FIGURES 3 and 10.

As water is heated in the tank 48 expansion will occur. Under ordinary circumstances the cartridge 24 is not replaced in the holder 25 until the water has been heated to a suitable temperature to brew coffee. Water expanding from the tank 48 can flow through the fitting 34 into the reservoir 27, the volume being negligible. When the cartridge is in place, however, the water my expand thereinto past the ball check valve 84.

The circuit illustrated in FIGURE 10 may be modified, as desired, and it is not a part of the invention since it is generally of a conventional character. The several heating elements 16', other than the master element which actuates the micro-switch 82, may be utilized for maintaining coffee in the containers 17 at proper temperatures.

What is claimed is:

1. In apparatus for making coffee as described, the combination of a cylindrical container having a hinged cover and having a central bottom inlet opening and an eccentric bottom outlet opening, a tubular fitting in the container having one of its ends disposed within the inlet opening and extending upwardly therefrom, a hot water supply pipe having one of its ends connected to the lower end of the tubular fitting and extending downwardly and outwardly therefrom, a removable, inverted frusto-conical coffee cartridge, closed at its lower end, the cartridge having its lower end supported on the upper end of the tubular fitting and having a bottom opening communicating therewith, means providing a seal between the upper end of the tubular fitting and the bottom opening of the cartridge, a check valve in the cartridge communicating with its bottom opening, an integral angular, radially outwardly and upwardly extending peripheral flange on the upper end of the cartridge, an elongated handle connected to the cartridge adjacent its upper end and extending radially outwardly over the top of the container, a filter disk extending across the upper portion of the cartridge and having a marginal portion thereof supported on the flange, and a conical cage having an annular lower peripheral portion engageable with a marginal portion of the filter disk, and secured by said hinged cover, and having a screen connected to its annular lower peripheral portion and extending across it.

2. The structure of claim 1, and a perforated annular spacer element surrounding the cartridge, above its lower end, having means removably supporting it on the inner wall of the container, the flange having indentations in its upstanding peripheral edge portion, above the filter disk, and the container having a syphon tube operatively positioned in the bottom thereof and extending downwardly through its outlet opening.

3. In apparatus for making coffee comprising, in combination, a cabinet providing an enclosed compartment positioned rearwardly thereof and having a forward portion of reduced height providing a horizontally extending planar top surface having an opening therein, a stationary water heater within the compartment having an inlet and an outlet, a water supply pipe communicating with the heater inlet and having a solenoid valve therein, a scale in the forward portion of the housing having a platform disposed within the opening adapted to support a receptacle for beverage coffee, and having switch means acted upon by downward movement of the platform in response to a load of predetermined weight, relay means responsive to the switch means adapted to close the valve, and other switch means coacting with the relay means to open the valve, the combination of a bracket connected to the cabinet and extending outwardly therefrom, above its forward portion, a cylindrical container disposed vertically above the opening, in spaced apart relation thereto, and supported on the outer end of the bracket, the container having a hinged cover and having a central bottom inlet opening and an eccentric bottom outlet opening, a tubular fitting in the container having one of its ends disposed within the inlet opening and extending upwardly therefrom, a water discharge pipe having one of its ends connected to the heater outlet and having its opposite end connected to the lower end of the tubular fitting, a removable, inverted frusto-conical cartridge, closed at its lower end and adapted to contain ground coffee, disposed within the container, centrally thereof, above its bottom, the cartridge having its lower end supported on the upper end of the tubular fitting and having a bottom opening communicating therewith, means providing a seal between the upper end of the tubular fitting and the bottom opening of the cartridge, a check valve in the cartridge communicating with its bottom opening, an integral angular, radially outwardly and upwardly extending peripheral flange on the upper end of the cartridge, an elongated handle connected to the cartridge adjacent its upper end and extending radially outwardly over the top of the container, a filter disk extending across the upper portion of the cartridge and having a marginal portion thereof supported on the flange, and a conical cage depending from the cover having an annular lower peripheral portion engageable with a marginal portion of the filter disk, above the flange, in the closed position of the cover, and having a screen connected to its annular lower peripheral portion and extending across it.

References Cited in the file of this patent

UNITED STATES PATENTS

| Re. 22,879 | Peters | May 13, 1947 |
| 2,567,027 | Peters | Sept. 4, 1951 |
| 2,900,894 | Tritt | Aug. 25, 1959 |

FOREIGN PATENTS

| 457,944 | Great Britain | Dec. 9, 1936 |